United States Patent [19]

Tsuji et al.

[11] Patent Number: 5,207,342

[45] Date of Patent: May 4, 1993

[54] HOUSING FOR ELECTRONIC DEVICE

[75] Inventors: Kiyoaki Tsuji; Hitoshi Saito, both of Kanagawa, Japan

[73] Assignee: Sony Corporation, Japan

[21] Appl. No.: 913,937

[22] Filed: Jul. 17, 1992

[30] Foreign Application Priority Data

Jul. 25, 1991 [JP] Japan .................................. 3-186354

[51] Int. Cl.⁵ ............................................ B65D 6/00
[52] U.S. Cl. .................................. 220/4.02; 220/4.21; 220/4.28; 361/424
[58] Field of Search ..................... 220/4.02, 4.21, 4.28; 369/77.1; 312/263, 264, 328; 361/424, 392, 394, 399; 174/35 R, 50, 52.1, 65 R; 206/444

[56] References Cited

U.S. PATENT DOCUMENTS

| | | | |
|---|---|---|---|
| 4,844,261 | 7/1989 | Ishii | 206/444 |
| 4,850,657 | 7/1989 | Placke et al. | 220/4.21 X |
| 4,884,710 | 12/1989 | Kleine et al. | 220/4.28 X |
| 4,979,636 | 12/1990 | Daly | 174/65 R |
| 5,162,610 | 11/1992 | Clifton et al. | 361/424 X |

*Primary Examiner*—Allan N. Shoap
*Assistant Examiner*—Paul A. Schwarz
*Attorney, Agent, or Firm*—Ronald P. Kananen

[57] ABSTRACT

An electronic device such as an external floppy disk drive is accommodated in a housing which has lower and upper cabinets and a door flap. The lower cabinet has at least a pair of first engaging teeth attached to respective side walls thereof, and a pair of spaced lugs mounted on respective side edges of an end thereof. The upper cabinet has at least a pair of second engaging teeth attached to the side walls, respectively, and a pair of spaced side flaps mounted on respective side edges of an end thereof. The first and second cabinets are superposed on each other with the first engaging teeth slidingly engaging the second engaging teeth, respectively. A pair of bushings is inserted in registered holes defined in the lugs and the side flaps. A door flap is angularly movably supported on the first and second cabinets by the bushings.

6 Claims, 2 Drawing Sheets

HOUSING FOR ELECTRONIC DEVICE

BACKGROUND OF THE INVENTION

1. Field of the Invention

The present invention relates to a housing for an electronic device, and more particularly to a housing for accommodating an electronic device such as an external floppy disk drive (FDD) which is to be externally connected to an existing computer.

2. Description of the Prior Art

Known housings for accommodating external floppy disc drives comprise lower and upper cabinets which are fastened to each other by screws that are threaded from the bottom of the lower cabinet through the lower cabinet into the upper cabinet. The conventional housings are made up of a relatively large number parts. For example, the upper and lower cabinets are fastened to each other by at least four screws. The housings cannot be assembled as the assembling process includes tightening of the four screws. The housings are not aesthetically pleasing as the heads of the screws are exposed on the bottom of the lower cabinet.

OBJECTS AND SUMMARY OF THE INVENTION

It is an object of the present invention to provide a housing that is made up of a relatively small number of parts, can be assembled with ease, and has an aesthetically pleasing appearance.

According to the present invention, there is provided a housing for accommodating a device therein, comprising a first cabinet having a pair of spaced side walls, at least a pair of first engaging teeth attached to the side walls, respectively, and a pair of spaced lugs mounted on respective side edges of an end thereof, the lugs having respective holes defined therein, a second cabinet having a pair of spaced side walls, at least a pair of second engaging teeth attached to the side walls, respectively, and a pair of spaced side flaps mounted on respective side edges of an end thereof, the side flaps having respective holes defined therein, the first and second cabinets being superposed on each other with the first engaging teeth slidingly engaging the second engaging teeth, respectively, the holes in the lugs being held in registry with the holes in the side flaps, respectively, a pair of bushings inserted in the holes in the lugs and the holes in the side flaps, and a door flap angularly movably supported on the first and second cabinets by the bushings.

No screws are used in fixing the first and second cabinets to each other. Therefore, the housing is made up of a relatively small number of parts, and can be assembled with ease. The housing has an aesthetically pleasing appearance as no screw heads are exposed.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

A housing according to the present invention is particularly useful for accommodating an electronic device such as an external floppy disk drive (FDD) to be externally connected to an existing computer.

Figure 1:
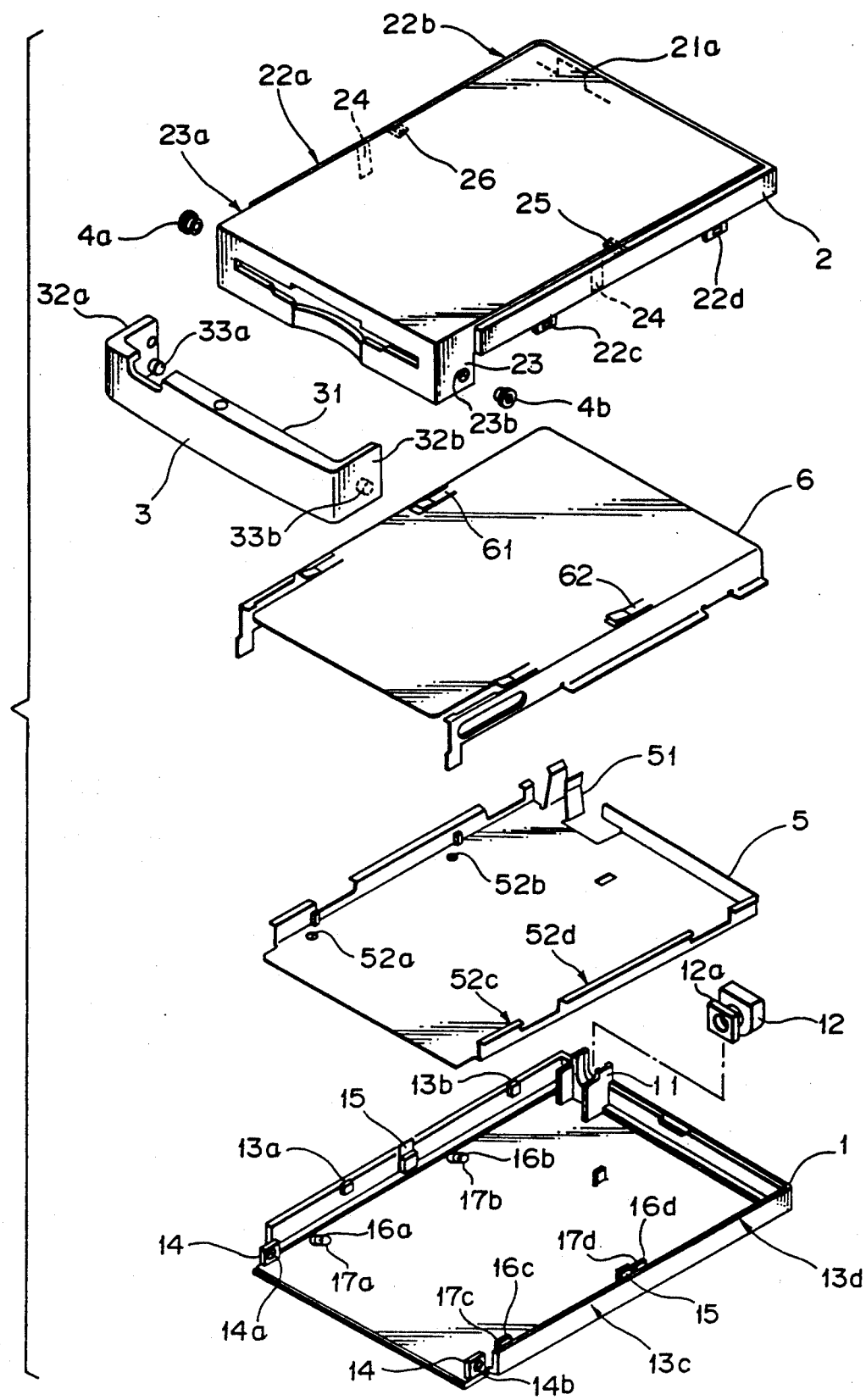
FIG. 1 is a perspective view of a housing according to the present invention.

As shown in FIG. 1, the housing basically comprises a lower cabinet 1, an upper cabinet 2, and a door flap 3. The lower cabinet 1, which is of an elongate rectangular shape, has a cord clamp 11 attached to an upwardly extending rear wall thereof for clamping a connector cord (not shown) of an electronic device such as a floppy disk drive (not shown) disposed at a rear end portion of the housing. A rib flange 12 to be secured to the connector cord is inserted in the cord clamp 11, the rib flange 12 having a square engaging member 12a.

The lower cabinet 13 also has a pair of spaced engaging teeth 13a, 13b on one upwardly extending side wall and a pair of spaced engaging teeth 13c, 13d on an opposite upwardly extending side wall. The lower cabinet 13 has a pair of upstanding lugs 14 disposed respectively on opposite side edges of a front portion of a bottom wall of the lower cabinet 13. The lugs 14 will be superposed on respective side flaps 23 of the upper cabinet 2. The lugs 14 have respective holes 14a, 14b defined therein which will be held in registry with respective holes 23a, 23b defined in the respective side flaps 23 when the lugs 14 are superposed on the side flaps 23, respectively.

A pair of upwardly projecting locking legs 15 for locking a lower shield 5 (described later) is mounted respectively on inner surfaces of the side walls of the lower cabinet 1. The bottom wall of the lower cabinet 1 has four bosses 16a, 16b, 16c, 16d for supporting and positioning the lower shield 5 and the floppy disk drive to be accommodated in the housing. The bosses 16a, 16b, 16c, 16d are surrounded by respective upwardly raised steps 17a, 17b, 17c, 17d which keep the lower shield 5 lifted slightly off the bottom wall of the lower cabinet 1.

The lower shield 5, which is also of an elongate rectangular shape, can be neatly placed in the lower cabinet 1. The lower shield 5 has upwardly bent side and rear edges which, when the lower shield 5 is placed in the lower cabinet 1, are positioned along and against the side and rear walls, respectively, of the lower cabinet 1. The lower shield 5 has a pair of upwardly bent arms 51 on its rear end for covering the connector cord. The lower shield 5 also has holes 52a, 52b, 52c, 52d defined therein which will receive the respective bosses 16a, 16b, 16c, 16d of the lower cabinet 1.

The upper cabinet 2 has a recess 21a defined in a downwardly projecting rear wall thereof for receiving the engaging member 12a of the rib flange 12. The upper cabinet 2 also has a pair of spaced engaging teeth 23a, 23b on one downwardly extending side wall and a pair of spaced engaging teeth 23c, 23d on an opposite downwardly extending side wall. These engaging teeth 23a, 23b, 23c, 23d will slidingly engage the engaging teeth 13a, 13b, 13c, 13d, respectively, when the lower and upper cabinets 2, 1 are combined together as described later on. The side flaps 23 extend downwardly from opposite side edges of a front portion of a top wall of the upper cabinet 2.

A pair of downwardly projecting locking legs 24 for locking an upper shield 6 (described later) is mounted respectively on inner surfaces of the side walls of the upper cabinet 2. The top wall of the upper cabinet 2 has a pair of ridges 25, 26 on its inner surface near the side walls, respectively, of the upper cabinet 2.

The upper shield 6, which is also of an elongate rectangular shape, can be neatly placed in the upper cabinet 2. The upper shield 6 has downwardly bent side and rear edges which, when the shield 6 is placed in the upper cabinet 2, are positioned along and against the side and rear walls, respectively, of the upper cabinet 2. The upper shield 6 also has a pair of upwardly raised tongues 61, 62 on its top wall near the respective side edges thereof in alignment with the respective ridges 25, 26 of the upper cabinet 2. When the upper shield 6 is put in the upper cabinet 2, the tongues 61, 62 are engaged by the respective ridges 25, 26 to hold the upper shield 6 slightly spaced from the top wall of the upper cabinet 2.

Figure 2A:
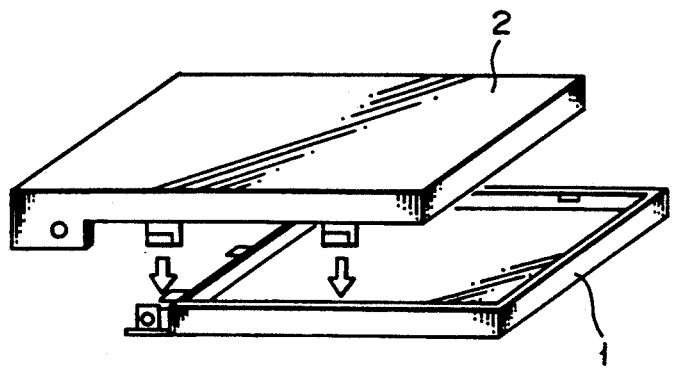
FIGS. 2A through 2E are perspective views showing the manner in which the housing is assembled.
Figure 2B:
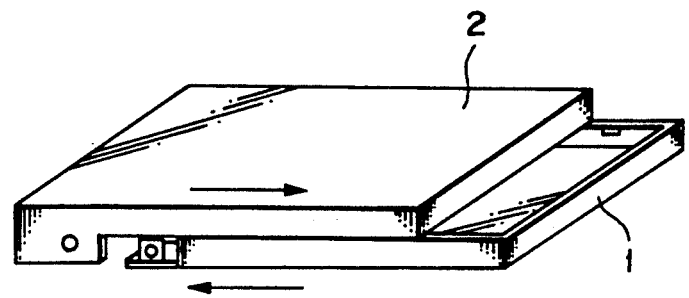
Figure 2C:
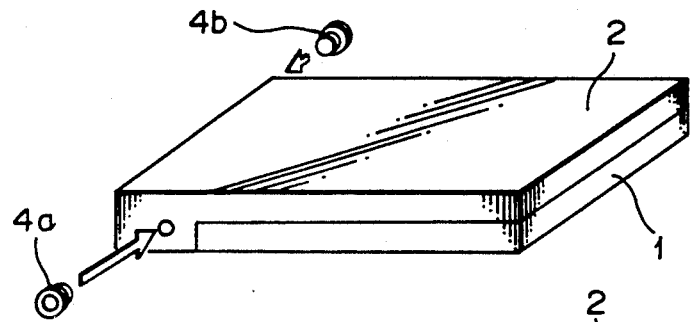

The housing shown in FIG. 1 is assembled as follows: The lower shield 5 is placed in the lower cabinet 1 and retained therein by the locking legs 15, and the upper shield 6 is placed in the upper cabinet 2 and retained therein by the locking legs 24. As shown in FIG. 2A, the upper cabinet 2 is superposed on the lower cabinet 1 in longitudinally staggered relationship. Then, as shown in FIG. 2B, the upper cabinet 2 is slid rearwardly with respect to the lower cabinet 1 until the engaging teeth 13a, 13b, 13c, 13d slidingly engage the engaging teeth 23a, 23b, 23c, 23d, respectively, and the engaging member 12a is snugly received in the recess 21a. The holes 14a, 14b in the lugs 14 of the lower cabinet 1 are now held in registry with the respective holes 23a, 23b in the side flaps 23 of the upper cabinet 2. Bushings 4a, 4b are then inserted into the holes 14a, 23a and the holes 14b, 23b, as shown in FIG. 2C. The lower cabinet 1 and the upper cabinet 2 are now firmly fixed to each other.

As shown in FIG. 1, the housing also includes a door flap 3 of a substantially C-shaped cross section. The door flap 3 comprises an elongate central panel 31 and a pair of laterally spaced support arms 32a, 32b projecting in one direction from the opposite ends of the elongate central panel 31. The support arms 32a, 32b have respective pivot pins 33a, 33b projecting toward each other from confronting surfaces thereof.

Figure 2D:
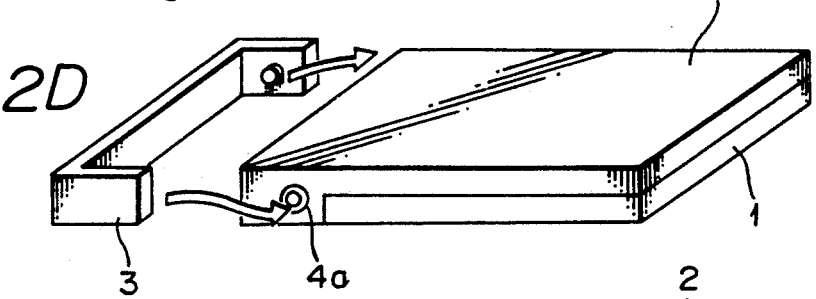
Figure 2E:
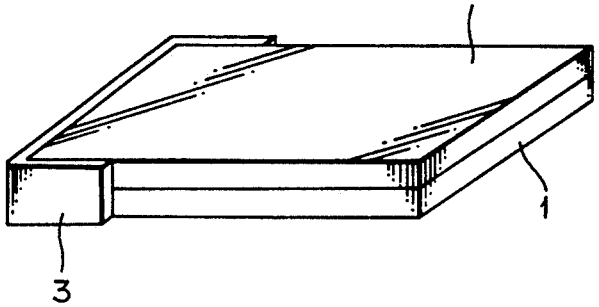

As shown in FIG. 2D, the pivot pins 33a, 33b of the door flap 3 are inserted respectively into the bushings 4a, 4b. The bushings 4a, 4b are now concealed from view by the respective support arms 32a, 32b, as shown in FIG. 2E.

The pivot pins 33a, 33b have a diameter slightly smaller than the diameter of the holes in the bushings 4a, 4b such that the door flap 3 is angularly movable about the pivot pins 33a, 33b. When the door flap 3 is lowered, as shown in FIG. 2E, the elongate central panel 31 fully closes a slot defined in a front wall of the upper cabinet 2.

Since no screws are used in fixing the lower cabinet 1 and the upper cabinet 2 to each other, the housing is made up of a relatively small number of parts, and can be assembled with ease. The housing has an aesthetically pleasing appearance as no screw heads are exposed and the bushings 4a, 4b are concealed from view by the support arms 32a, 32b of the door flap 3.

In the housing, the lower and upper shields 5, 6 are spaced slightly from the bottom and top walls, respectively, of the lower and upper cabinets 1, 2. The floppy disk drive (not shown) that is placed in the housing is therefore resiliently supported and sandwiched by the shields 5, 6 for protection against shocks.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A housing for accommodating a device therein, comprising:
   a first cabinet having a pair of spaced side walls and a pair of spaced ends, at least a pair of first engaging teeth attached to the side walls, respectively, and a pair of spaced lugs mounted on respective side edges of said spaced ends thereof, said lugs having respective holes defined therein;
   a second cabinet having a pair of spaced side and a pair of spaced ends walls at least a pair of second engaging teeth attached to the side walls, respectively, and a pair of spaced side flaps mounted on respective side edges of said spaced ends thereof, said side flaps having respective holes defined therein;
   said first and second cabinets being superposed on each other with said first engaging teeth slidingly engaging said second engaging teeth, respectively, said holes in the lugs being held in registry with said holes in the side flaps, respectively;
   a pair of bushings inserted in said holes in the lugs and said holes in the side flaps; and
   a door flap angularly movably supported on said first and second cabinets by said bushings.

2. A housing according to claim 1, wherein said first cabinet has an engaging member disposed on an end wall remote from said spaced ends thereof, and said second cabinet has a recess defined in an end wall remote from said spaced ends thereof, said engaging member being snugly received in said recess.

3. A housing according to claim 1, wherein said door flap has a pair of spaced support arms having respective pivot pins, said pivot pins being inserted in said bushings, respectively.

4. A housing according to claim 1, further including a first shield disposed in said first cabinet and spaced from a bottom wall thereof which extends between said side walls thereof, and a second shield disposed in said second cabinet and spaced from a top wall thereof which extends between said side walls thereof.

5. A housing according to claim 4, wherein said first cabinet has a pair of first locking legs attached respectively to the side walls thereof, said first shield being retained in said first cabinet by said first locking legs, and said second cabinet has a pair of second locking legs attached respectively to the side walls thereof, said second shield being retained in said second cabinet by said second locking legs.

6. A housing according to claim 4, wherein said first cabinet has a plurality of raised steps on said bottom wall thereof, said first shield being spaced from said bottom wall of the first cabinet by said steps, and said second cabinet has a plurality of raised ridges on said top wall thereof, said second shield being spaced from said top wall of the second cabinet by said ridges.

* * * * *